(12) United States Patent
Williams et al.

(10) Patent No.: US 7,611,141 B2
(45) Date of Patent: Nov. 3, 2009

(54) TOP REGISTERED ITEM TRANSPORT SYSTEM

(75) Inventors: Daniel J. Williams, Woodbury, CT (US); Luciano P. Dos Santos, Danbury, CT (US); Russell W. Holbrook, Southbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 12/200,633

(22) Filed: Aug. 28, 2008

(65) Prior Publication Data

US 2009/0159405 A1   Jun. 25, 2009

Related U.S. Application Data

(60) Provisional application No. 61/015,327, filed on Dec. 20, 2007.

(51) Int. Cl.
*B65H 3/04* (2006.01)

(52) U.S. Cl. .......................... 271/124; 271/34; 271/122; 198/626.4

(58) Field of Classification Search .................... 271/34, 271/122, 124; 198/620, 626.1–626.4
See application file for complete search history.

(56) References Cited

U.S. PATENT DOCUMENTS

| | | | | |
|---|---|---|---|---|
| 3,951,257 | A | * | 4/1976 | Storace et al. ............ 198/626.6 |
| 4,909,499 | A | * | 3/1990 | O'Brien et al. ........... 271/10.06 |
| 4,978,114 | A | * | 12/1990 | Holbrook ..................... 271/35 |
| 5,074,540 | A | | 12/1991 | Belec et al. |
| 5,094,440 | A | * | 3/1992 | Matsuo et al. ............... 271/121 |
| 5,172,901 | A | | 12/1992 | Sugimoto et al. |
| 5,238,236 | A | * | 8/1993 | Belec et al. .................... 271/34 |
| 5,913,627 | A | | 6/1999 | Freeman et al. |
| 6,139,140 | A | | 10/2000 | Rasmussen et al. |
| 6,276,679 | B1 | * | 8/2001 | Joyce et al. ................. 271/122 |
| 6,354,583 | B1 | * | 3/2002 | Skadow et al. ........... 271/10.03 |
| 6,585,251 | B2 | * | 7/2003 | Allen et al. .................. 271/121 |
| 6,641,132 | B2 | * | 11/2003 | Sekine ........................ 271/124 |
| 6,644,659 | B2 | * | 11/2003 | Skadow et al. ......... 271/265.02 |
| 6,776,098 | B2 | | 8/2004 | Manduley |
| 6,820,873 | B2 | | 11/2004 | Kulpa |
| 6,971,645 | B2 | * | 12/2005 | Coret et al. .................. 271/138 |
| 6,976,801 | B2 | | 12/2005 | Salomon et al. |
| 7,210,570 | B2 | * | 5/2007 | Marisy et al. ............. 198/626.1 |
| 2005/0097066 | A1 | | 5/2005 | Nambudiri |

* cited by examiner

*Primary Examiner*—Douglas A Hess
(74) *Attorney, Agent, or Firm*—Christopher H. Kirkman; Angelo N. Chaclas

(57) ABSTRACT

An item transport system includes a first transport element rotating around a plurality of first transport rollers in a first direction, a second transport element in opposing relation to the first transport element, the second transport element rotating around a plurality of second transport rollers in a second direction opposite to the first direction, a guide plate proximate to the first transport element for engaging the items during processing by an item processing element, and an item registration device configured to maintain the items in registration with the guide plate. The item registration device includes a plurality of independently articulating pivot assemblies biased to engage the second transport element with the first transport element and a plate associated with each pivot assembly. Each plate is fixedly constrained with respect to the pivot assembly at one end and slidably constrained with respect to the pivot assembly at another end.

23 Claims, 7 Drawing Sheets

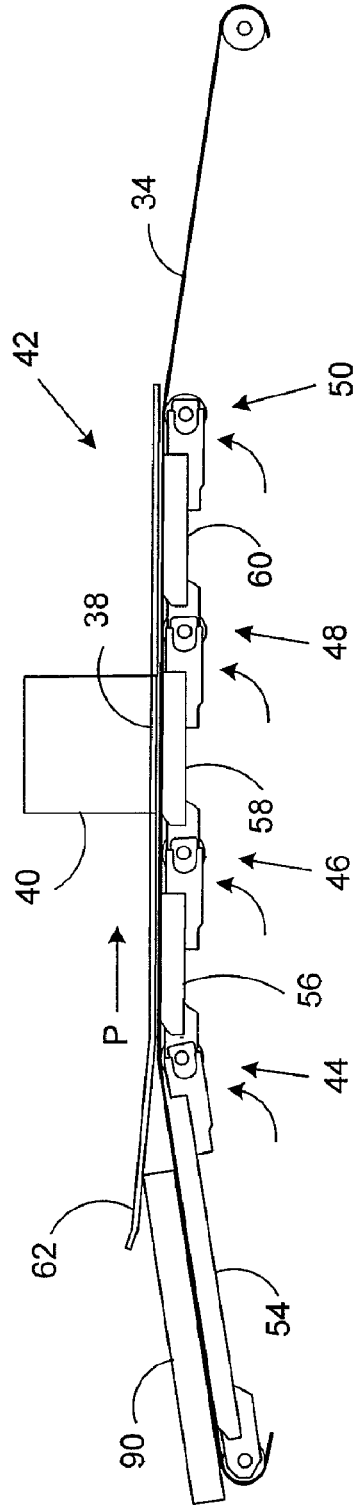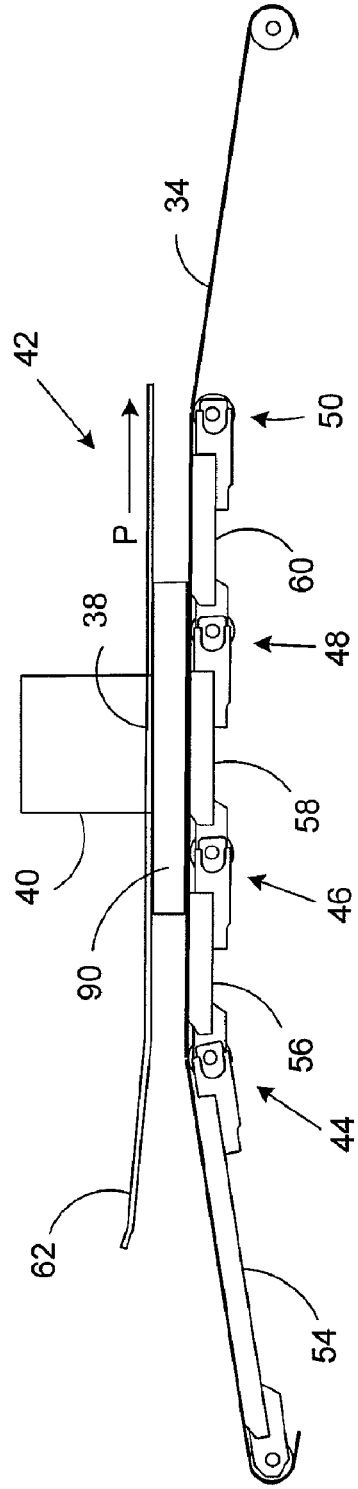

TOP REGISTERED ITEM TRANSPORT SYSTEM

CROSS REFERENCE TO RELATED APPLICATIONS

The benefit of priority is claimed under 35 U.S.C. 119(e) of U.S. Provisional Patent Application No. 61/015,327 filed Dec. 20, 2007, entitled "TOP REGISTERED TRANSPORT," which is incorporated by reference herein in its entirety.

FIELD OF THE INVENTION

The present invention relates to an item transport and, more particularly, to an item transport system that registers items for processing.

BACKGROUND OF THE INVENTION

Item transport systems, such as mailpiece handling systems, for example, are known in the art. These systems include inserter systems, which create mailpieces and prepare them for mailing, as well as sortation systems, which sort completed mailpieces and direct the mailpieces to storage pockets or bins, depending on the system's configuration. Sortation of mailpieces may be carried out either prior to mailing (i.e., outsorting) or upon receipt from a postal carrier (i.e., insorting). Other types of transport systems and related applications are known.

In some transport systems, mailpieces are transported using belts or chain drives between stations where they undergo various types of processing. The processing may include cutting, folding, scanning, weighing, printing, and labeling, for example.

Some of the processing steps require that a mailpiece be maintained in a particular orientation or at a particular distance from a processing element. In one example, a scanning device may require a particular alignment or offset distance between the mailpiece and the device. In another example, certain printing devices, such as inkjet printers, for example, require a constant offset with respect to the mailpiece to ensure printing integrity.

In those cases, the control of the mailpiece provided by the transport belts or chains may affect the ability to properly orient and register the mailpiece for processing. Such control may be difficult to maintain where consecutive mailpieces have different thicknesses, such as a post card followed by a catalog, for example.

SUMMARY OF EXEMPLARY ASPECTS

In the following description, certain aspects and embodiments of the present invention will become evident. It should be understood that the invention, in its broadest sense, could be practiced without having one or more features of these aspects and embodiments. It should also be understood that these aspects and embodiments are merely exemplary.

In accordance with the purpose of the invention, as embodied and broadly described herein, one aspect of the invention relates to an item transport system comprising a first transport element rotating around a plurality of first transport rollers in a first direction, a second transport element in opposing relation to the first transport element, the second transport element rotating around a plurality of second transport rollers in a second direction opposite to the first direction, a guide plate proximate to the first transport element for engaging the items during processing by an item processing element, and an item registration device configured to maintain the items in registration with the guide plate. In one embodiment, items received between the transport elements are conveyed along a transport path.

As used herein, "items" include papers, documents, postcards, envelopes, brochures, enclosures, booklets, magazines, media items, including CDs, DVDs, computer disks, and/or other digital storage media, and packages having a range of sizes and materials. The items may be unwrapped or may be covered with a wrapping material such as paper, a polymer wrap, such as polyethylene, for example, or other wrapping material.

In some embodiments, the item registration device comprises a plurality of independently articulating pivot assemblies biased to engage the second transport element with the first transport element, and a plate associated with each pivot assembly. Each plate may be fixedly constrained with respect to the pivot assembly at one end and slidably constrained with respect to the pivot assembly at another end.

In another aspect, the invention relates to an item transport system comprising a first transport element rotating around a plurality of first transport rollers in a first direction, a second transport element in opposing relation to the first transport element, the second transport element rotating around a plurality of second transport rollers in a second direction opposite to the first direction, a guide plate for maintaining the items at a fixed distance from an item processing element during processing by the item processing element, and an item registration device configured to maintain the items in registration with the guide plate. Items received between the transport elements may be conveyed along a transport path.

In one embodiment, the item registration device comprises an upstream roller assembly supporting at least one of the second transport rollers, a downstream roller assembly supporting at least one of the second transport rollers, a plurality of independently articulating pivot assemblies biased to engage the second transport element with the first transport element, and a plate associated with each pivot assembly. Each plate may be fixedly constrained with respect to the pivot assembly at one end and slidably constrained with respect to the pivot assembly at another end.

In a further aspect, the invention provides a method of conveying items comprising receiving the items in an item transport system, conveying the items between the transport elements along a transport path, and maintaining the items in registration with a guide plate during processing of the items by an item processing element using an item registration device.

In one embodiment, the item transport system comprises a first transport element rotating around a plurality of first transport rollers in a first direction and a second transport element in opposing relation to the first transport element, the second transport element rotating around a plurality of second transport rollers in a second direction opposite to the first direction.

In another embodiment, the item registration device comprises a plurality of independently articulating pivot assemblies biased to engage the second transport element with the first transport element and a plate associated with each pivot assembly. In a further embodiment, each plate is fixedly constrained with respect to the pivot assembly at one end and slidably constrained with respect to the pivot assembly at another end.

Aside from the structural and procedural arrangements set forth above, the invention could include a number of other arrangements, such as those explained hereinafter. It is to be understood that both the foregoing description and the following description are exemplary only.

BRIEF DESCRIPTION OF THE DRAWINGS

The accompanying drawings, which are incorporated in and constitute a part of this specification, illustrate several exemplary embodiments of the invention and, together with the description, serve to explain the principles of the invention. In the drawings.

FIGS. 6A-6D are schematic views illustrating the item registration device according to an embodiment of the invention processing consecutive items having a thickness differential.

DETAILED DESCRIPTION OF EXEMPLARY EMBODIMENTS

Reference will now be made in detail to exemplary embodiments of the invention, examples of which are illustrated in the accompanying drawings. Wherever possible, the same reference numbers will be used throughout the drawings to refer to the same or like parts.

Embodiments of the item transport according to the invention are described with reference to certain applications in mailpiece sortation systems. It should be understood, however, that the device of the invention may be used in association with other systems configured to handle and transport items. Further, many sortation systems are modular and may include more or fewer modules than those described herein based on the particular application.

Figure 1:
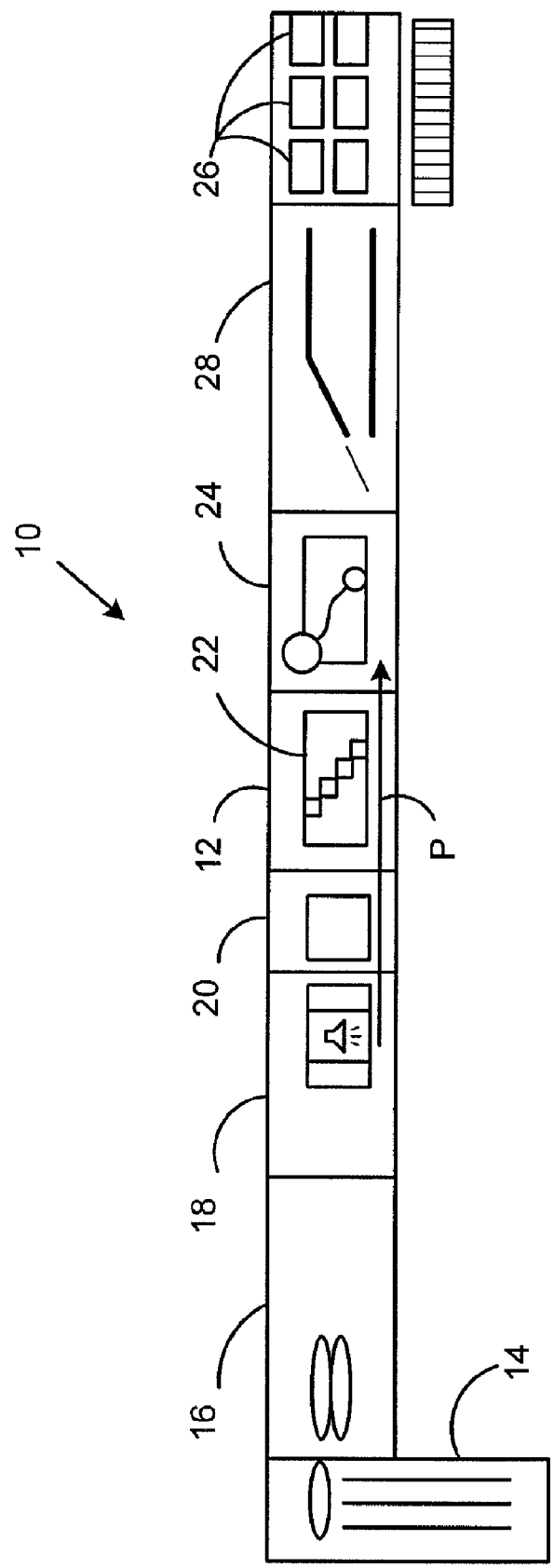
FIG. 1 is a block diagram of a sortation system incorporating a top registered item transport according to an embodiment of the invention.

A sortation system 10 incorporating a top registered item transport system 12 according to an embodiment of the invention is shown in FIG. 1. The sortation system 10 includes a feeder 14 for feeding items for sortation. From the feeder 14, the items are fed through a singulation module 16, which ensures that only one item at a time is processed by the system. The singulated items are fed along a transport path P for processing by various modules.

The items first pass through a scanning module 18, where an image of at least a portion of each item is obtained. The scanned image may be used by the controller (not shown) to determine the destination pocket for the item. As discussed above, bins may also be used, depending on the configuration of the sortation system. In the illustrated sortation system 10, the items then pass through a weighing module 20, where the weight of the item is obtained.

In some applications, a sortation system is used to apply markings, such as an address or code, for example, to the face of items being processed. Such markings may be added using a printer or labeler. Both a printing module 22 and a labeling module 24 are included in the illustrated sortation system 10.

Finally, the items are directed to the destination pocket 26 using a diverter module 28 in the transport path P. For systems with pockets 26 on multiple levels, an elevator arrangement (not shown) may be used to move the items to the appropriate level.

In the illustrated sortation system 10, the printer used in the printing module 22 comprises an inkjet printer. In order to ensure the highest quality printing from the inkjet printer, the printing module 22 is provided with an embodiment of the top registered item transport system 12 according to the invention, which maintains items at a fixed distance from the printer during printing.

Figure 2:
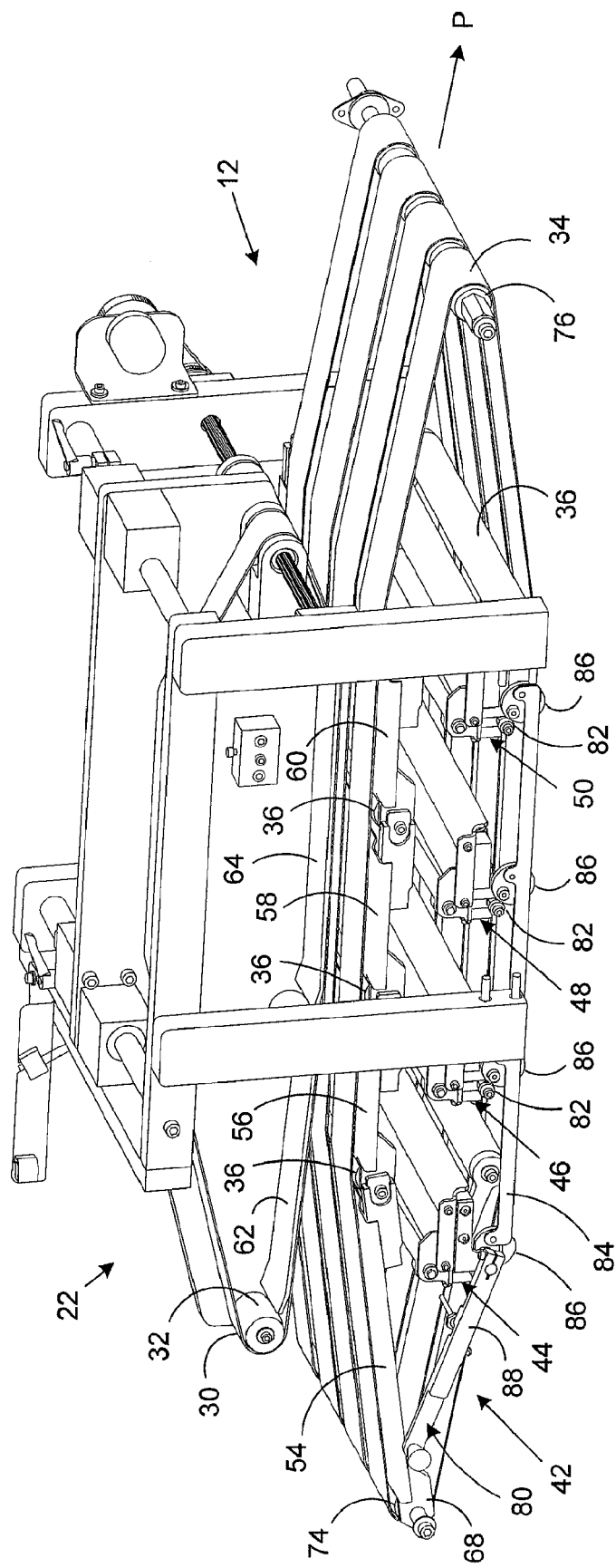
FIG. 2 is a perspective view of a printing module incorporating a top registered item transport according to an embodiment of the invention.
Figure 3:
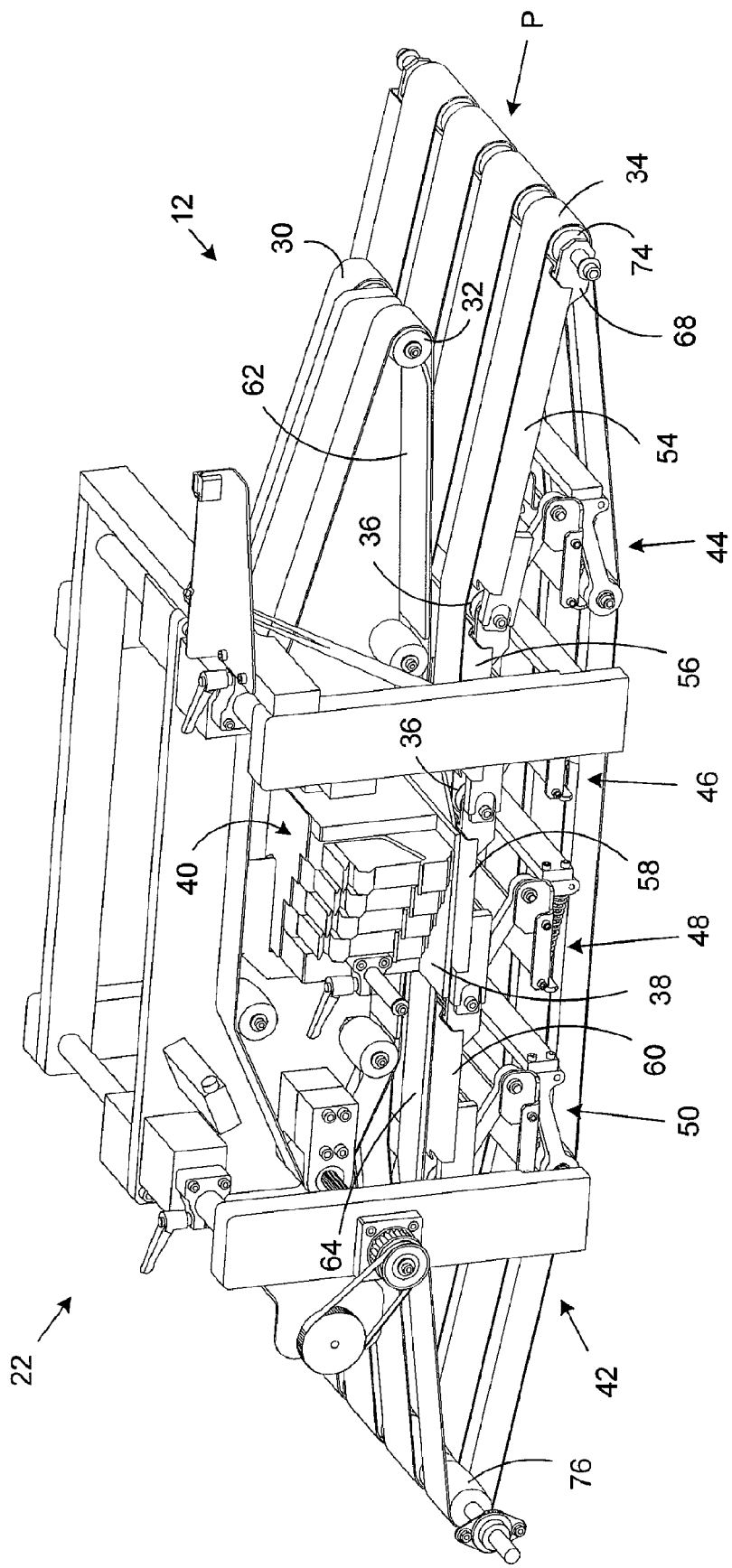
FIG. 3 is a perspective view of the printing module shown in FIG. 2 shown from the opposite side.

The printing module 22 incorporating the embodiment of the top registered item transport system 12 is shown in FIGS. 2 and 3. As shown, the item transport system 12 comprises a first transport element 30 rotating around a plurality of first transport rollers 32 in a first direction. In the illustrated embodiment, the first transport element 30 comprises a plurality of flat belts driven on smooth rollers. Alternatively, the first transport element 30 may comprise a single belt, for example, or a different number of belts than depicted in FIGS. 2 and 3. In further embodiments, the first transport element 30 may comprise O-rings driven with rollers, toothed belts driven with pulleys, chains driven with sprockets, or other drive combinations.

The item transport system 12 shown in FIGS. 2 and 3 further comprises a second transport element 34 in opposing relation to the first transport element 30. The illustrated second transport element 34 comprises a plurality of flat belts. In alternative embodiments, the second transport element 34 may comprise a single belt, for example, or a different number of belts than depicted in FIGS. 2 and 3. In further embodiments, the second transport element 34 may comprise other drive combinations, as discussed above.

In the illustrated embodiment, the first transport element 30 and the second transport element 34 are driven from the main drive system (not shown) of the sortation system 10. Alternative drive arrangements may also be used.

The second transport element 34 shown in FIGS. 2 and 3 rotates around a plurality of second transport rollers 36 in a second direction opposite to the first direction. In the depicted arrangement, items received between the transport elements 30, 34 are conveyed along the transport path P. Items are moved on the transport path P from left to right, as shown in FIG. 2 and from right to left, as shown in FIG. 3.

The illustrated item transport system 12 further comprises a guide plate 38 proximate to the first transport element 30 for engaging the items during processing by an item processing element 40. The item processing element 40 shown in FIG. 3 comprises an inkjet printer. In the illustrated embodiment, the print head nozzles of the inkjet printer and the guide plate 38 are arranged beside the belts. In other embodiments, the nozzles and the guide plate may be arranged between the belts. As discussed above, embodiments of the item transport system 12 according to the invention may have applicability for other types of item processing where the positioning and/or orientation of the items is relevant, such as scanning, for example.

The item transport system 12 shown in FIGS. 2 and 3 further comprises an item registration device 42 configured to maintain the items in registration with the guide plate 38. The illustrated item registration device 42 comprises a plurality of independently articulating pivot assemblies 44, 46, 48, 50 biased to engage the second transport element 34 with the first transport element 30. The pivot assemblies are biased using springs 52, shown in FIG. 5, but other biasing means may also be used.

The item registration device 42 further comprises a plate 54, 56, 58, 60 associated with each pivot assembly 44, 46, 48, 50. Each plate is fixedly constrained with respect to the pivot assembly at one end and slidably constrained with respect to the pivot assembly at another end. In the embodiment shown in FIGS. 2 and 3, each plate 54, 56, 58, 60 is fixedly constrained at an upstream end and slidably constrained at a downstream end. Other arrangements may also be used.

In operation, the first and second transport elements 30, 34 move items along the transport path P. The pivot assemblies 44, 46, 48, 50 of the item registration device 42 press the second transport element 34 into engagement with the first transport element 30 under a biasing force. Reaction plates 62, 64 are disposed on the item transport system 12 on an inner portion of the belts comprising the first transport element 30. Items entering between the transport elements 30, 34 encounter the reaction plates 62, 64 and displace the pivot assemblies 44, 46, 48, 50 by an amount based on the thickness of the respective items. Thus, thicker items displace the pivot assemblies to a greater extent than thinner items.

As the items move between the transport elements 30, 34 past the item processing element 40, the item registration device 42 maintains the items in registration with the guide plate 38, which is disposed on the item transport system 12 beside the belts comprising the first transport element 30. The guide plate 38 maintains the items at a fixed distance from the item processing element 40.

In one example, the guide plate 38 holds the upper edge of items being processed at a distance ranging from 0.02 inches to 0.04 inches from the print head nozzles of the inkjet printer. Other offset distances may be used with other item processing elements, as appropriate.

Some embodiments of the guide plate 38 comprise a curved upstream edge configured to receive the leading edge of passing items. In further embodiments, the guide plate has a cutout portion through which ink may be applied from the inkjet printer.

The independently articulating pivot assemblies 44, 46, 48, 50 are configured to provide positive control between the transport elements 30, 34 for consecutive items having a thickness differential. In one embodiment, the thickness differential is up to approximately 1.75 inches. Thus, the item transport system 12 may allow the processing of a catalog followed by a post card, for example, in which the item transport system 12 maintains positive control of the consecutive items, while properly maintaining each item in registration with the guide plate 38.

Figure 4:
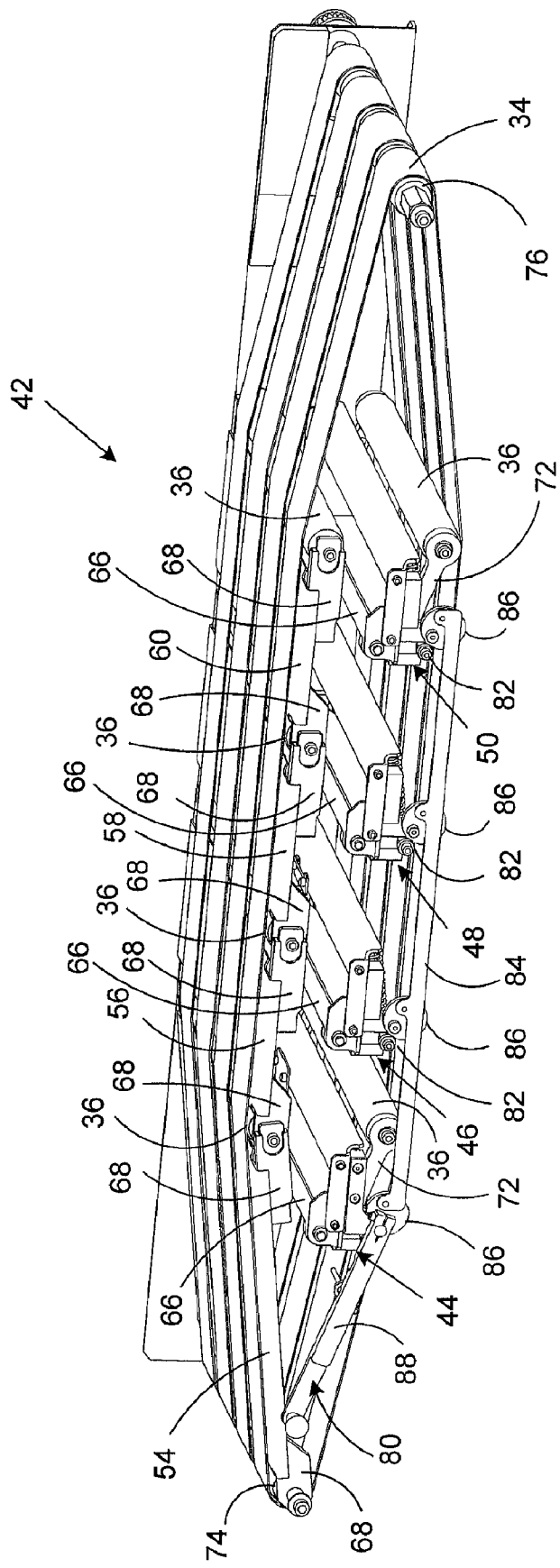
FIG. 4 is a perspective view of an item registration device according to an embodiment of the invention.
Figure 5:
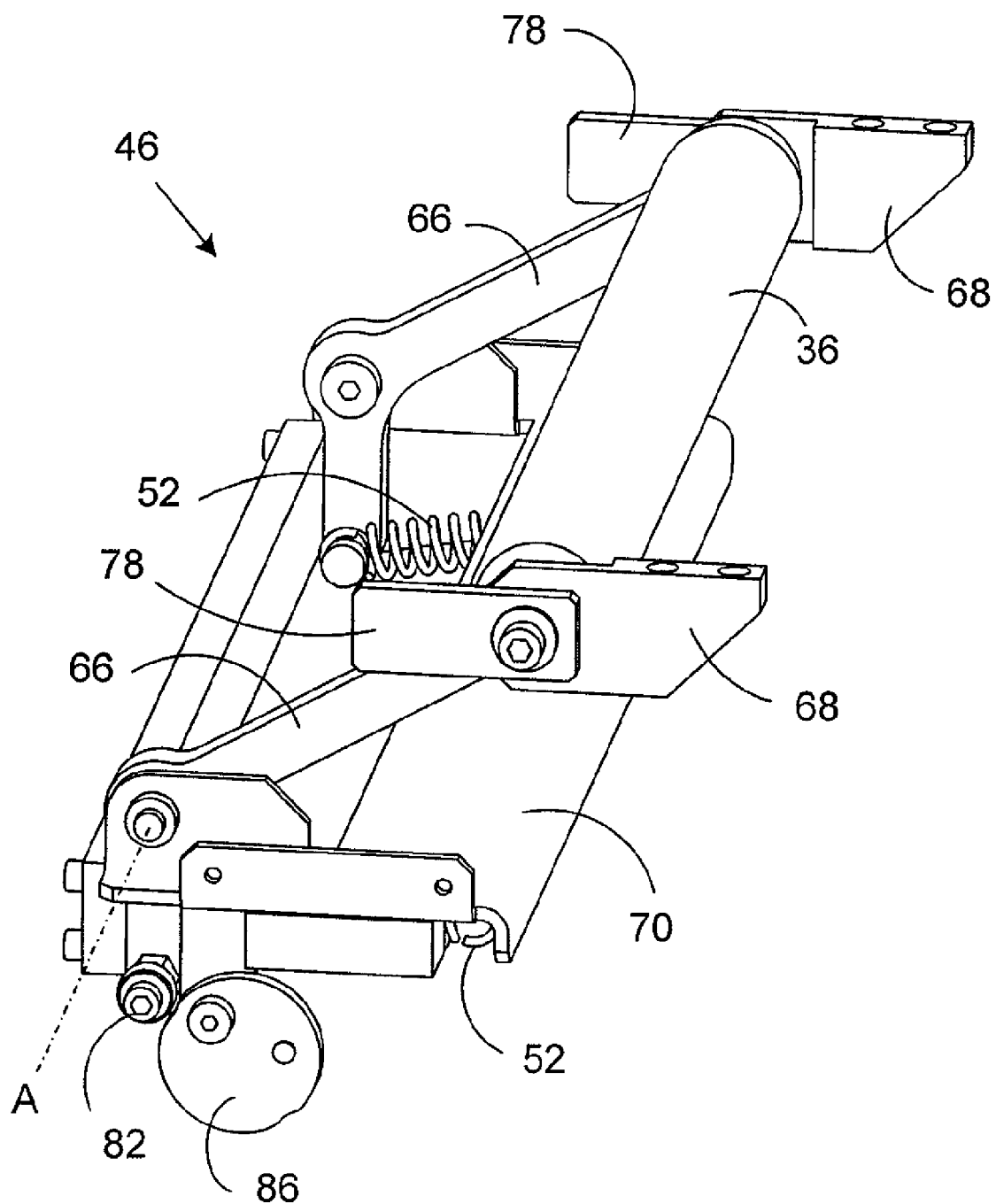
FIG. 5 is a detail view of a portion of the item registration device of FIG. 4.

The item registration device 42 is shown in greater detail in FIG. 4. As shown, the plurality of independently articulating pivot assemblies 44, 46, 48, 50 comprises an upstream angle pivot assembly 44, a downstream angle pivot assembly 50, and at least one intermediate pivot assembly 46, 48 disposed between the upstream angle pivot assembly 44 and the downstream angle pivot assembly 50. A portion of an intermediate pivot assembly is shown in FIG. 5 in greater detail. The illustrated embodiment contains two intermediate pivot assemblies 44, 46. Other numbers of intermediate pivot assemblies may also be used.

Each pivot assembly comprises a first member 66 pivotable about a pivot axis A substantially perpendicular to the transport path P. Each pivot assembly further comprises at least one of the second transport rollers 36 and a plate support element 68 disposed on the first member 66. In the illustrated embodiment, each pivot assembly comprises two first members 66 connected by a bracket 70. As shown, one of the first members 66 is arranged at each end of a respective second transport roller 36 to support the roller. Other arrangements may also be used.

As shown in FIG. 4, the upstream angle pivot assembly 44 and the downstream angle pivot assembly 50 further comprise a second member 72 arranged at an angle with respect to the first member 66. In the illustrated embodiment, the first and second members 66, 72 are spaced at approximately 60 degrees. Other angles may also be used. The second member 72 is pivotable with the first member 66 about the pivot axis A. The illustrated upstream and downstream angle pivot assemblies 44, 50 each comprise first and second members 66, 72 formed as an integral component, but those members may alternatively be formed as separate elements. At least one of the second transport rollers 36 is disposed on the second member 72.

In the illustrated embodiment, the upstream angle pivot assembly 44 and the downstream angle pivot assembly 50 comprise two second members 72. As shown, one of the second members 72 is arranged at each end of a respective second transport roller 36 to support the roller. Other arrangements may also be used.

As shown in FIG. 4, the item registration device 42 further comprises an upstream roller assembly 74 and a downstream roller assembly 76, each supporting at least one of the second transport rollers 36. The upstream roller assembly 74 further comprises a plate support element 68.

As discussed above and as shown in FIGS. 2-4, the second transport element 34 is supported for rotation on the plurality of second transport rollers 36 associated with the pivot assemblies 44, 46, 48, 50 and the roller assemblies 74, 76. The rollers 36 of the upstream roller assembly 74 and the upstream angle pivot assembly 44 provide three support points for the second transport element 34. In similar fashion, the rollers 36 of the downstream roller assembly 76 and the downstream angle pivot assembly 50 also provide three support points for the second transport element 34.

As the upstream and downstream angle pivot assemblies 44, 50 pivot, the respective first and second members 66, 72 maintain a constant angular spacing. Therefore, irrespective of the pivot angle, the rollers 36 on the first and second members 66, 72 of the angle pivot assemblies 44, 50 continue to support the second transport element 34. Thus, even when the angle pivot assemblies 44, 50 are in a pivoted position, they provide a substantially constant path length for the second transport element 34 and thereby maintain the tension in the second transport element 34. Because the tension in the second transport element 34 is maintained irrespective of the pivot angle of the angle pivot assemblies 44, 50, the item transport system 12 maintains positive control of items of varying thickness as they are conveyed between the transport elements 30, 34.

With reference to FIGS. 2-4, each plate 54, 56, 68, 60 associated with a respective pivot assembly 44, 46, 48, 50 is connected to plate support elements 68 that provide a fixed constraint at the upstream end and a sliding constraint at the downstream end. In the illustrated embodiment, there are four plates 54, 56, 68, 60. The upstream roller assembly 74 comprises a plate support element 68 at each end providing a fixed constraint at the upstream end of the first plate 54. The upstream angle pivot assembly 44 comprises a plate support element 68 on each first member 66 providing a sliding constraint with a slider 78 at the downstream end of the first plate 54. The upstream angle pivot assembly 44 further comprises an additional plate support element 68 on each first member 66 providing a fixed constraint at the upstream end of the second plate 56.

Each subsequent downstream pivot assembly 46, 48 comprises plate support elements 68 that provide a sliding constraint for the upstream plate and a fixed constraint for the downstream plate. The upstream slider 78 and the downstream plate support element 68 on an exemplary intermediate pivot assembly 46 are shown in detail in FIG. 5.

The downstream angle pivot assembly 50 comprises only one plate support element 68 on each first member 66 providing a sliding constraint at the downstream end of the fourth plate 60. No fixed constraint is provided because in the illustrated embodiment there is no fifth plate downstream of the downstream pivot assembly 50. As discussed above, alternative arrangements utilizing other than four pivot assemblies and four plates may also be used.

The item transport system 12 shown in FIGS. 2 and 3 comprises a deactivation lever 80, which moves the item registration device 42 to a deactivated (i.e., inoperative) position and allows the item transport system 12 to function merely as a transport. In the deactivated position, all of the pivot assemblies 44, 46, 48, 50 are fully pivoted against the biasing force of the springs so that they do not press the second transport element 34 into engagement with the first transport element 30. With the item registration device 42 in the deactivated position, the items conveyed by the system are not maintained in registration with the guide plate 38, but instead are conveyed through the device with no change in orientation or alignment. Deactivation of the item registration device 42 may be desirable to minimize wear on the system components when printing is not being carried out on the items being processed, for example.

In embodiments of the item transport system 12 comprising a deactivation lever, each pivot assembly comprises a follower 82, as shown in FIGS. 2, 4, and 5. In those embodiments, the item transport system 12 further comprises an elongated member 84, a plurality of cams 86 disposed on the elongated member 84, and an actuator 88 for translating the elongated member 84. Each of the plurality of cams 86 engages a respective follower 82. Translation of the elongated member 84 causes rotation of the cams 86 and corresponding motion of the respective followers 82 to move the pivot assemblies 44, 46, 48, 50 to the deactivated position in which the second transport element 34 is spaced from the first transport element 30.

An embodiment of a method according to the invention comprises receiving items in an item transport system. The item transport system 12 in one embodiment comprises a first transport element 30 rotating around a plurality of first transport rollers 32 in a first direction and a second transport element 34 in opposing relation to the first transport element 30. The second transport element 34 rotates around a plurality of second transport rollers 36 in a second direction opposite to the first direction.

The method further comprises conveying the items between the transport elements 30, 34 along the transport path P and maintaining the items in registration with the guide plate 38 during processing of the items by an item processing element 40 using an item registration device 42. The item registration device 42 in one embodiment comprises a plurality of independently articulating pivot assemblies 44, 46, 48, 50 biased to engage the second transport element 34 with the first transport element 30 and a plate 54, 56, 58, 60 associated with each pivot assembly. Each plate is fixedly constrained with respect to the pivot assembly at one end and slidably constrained with respect to the pivot assembly at another end.

In another embodiment, the method further comprises providing positive control between the transport elements for consecutive items having a thickness differential of up to approximately 1.75 inches.

In one example, the item processing element comprises an inkjet printer. Applications utilizing other item processing elements are also envisioned.

FIGS. 6A-6D are schematic views illustrating the item registration device 42 according to an embodiment of the invention processing consecutive items having a thickness differential, such as a catalog 90 having a thickness of approximately 1.75 inches, for example, and a postcard 92 having a thickness of approximately 0.01 inches, for example. The first transport element 30 is not shown in FIGS. 6A-6D for clarity and the second transport element 34 and the item registration device 42 are shown only in part.

FIG. 6A shows the catalog 90 entering the item transport system 12 and encountering the reaction plate 62. As the catalog 90 proceeds farther along the transport path P between the first transport element (not shown) and the second transport element 34, the thickness of the catalog 90 displaces the plates 54, 56, 58, 60 associated with respective pivot assemblies 44, 46, 48, 50 against the biasing force of the pivot assemblies indicated by arrows in FIG. 6A. The catalog 90 displaces the plates by an amount based on its thickness.

FIG. 6B shows the catalog 90 in position under the item processing element 40 with the item registration device 42 maintaining the catalog 90 in registration with the guide plate 38. As discussed previously, the processing may comprise printing, scanning, or other processes.

Figure 6C:
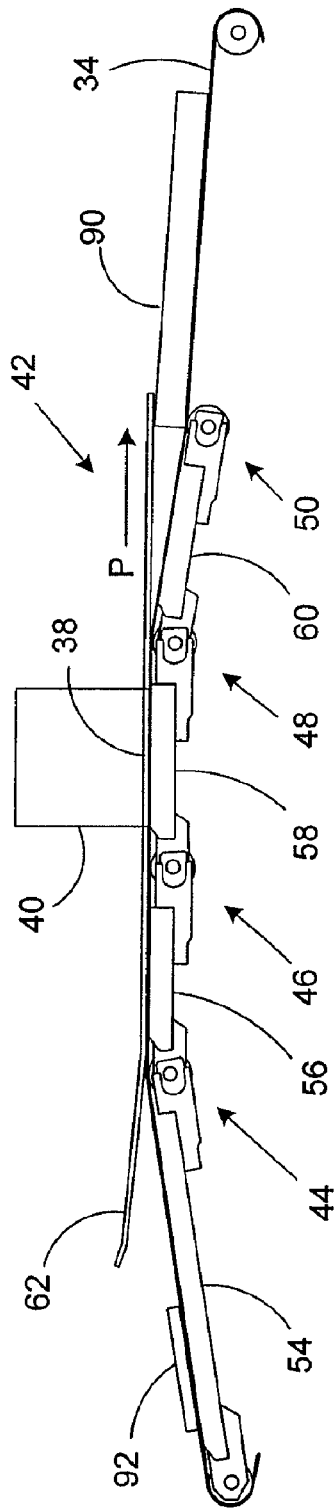

FIG. 6C shows the catalog 90 moving out of the item transport system 12 and the postcard 92 entering the system 12. Once the catalog 90 has passed through, the plates upstream of the catalog return to their original positions under the biasing force of the pivot assemblies, thus allowing the transport elements 30, 34 to maintain positive control of both the downstream relatively thick catalog 90 and the upstream relatively thin postcard 92.

The postcard 92 subsequently enters the item transport system 12 and encounters the reaction plate 62. As the postcard 92 proceeds farther along the transport path P between the first transport element (not shown) and the second transport element 34, the thickness of the postcard 92 displaces the plates 54, 56, 58, 60 associated with respective pivot assemblies 44, 46, 48, 50 against the biasing force of the pivot assemblies.

Figure 6D:
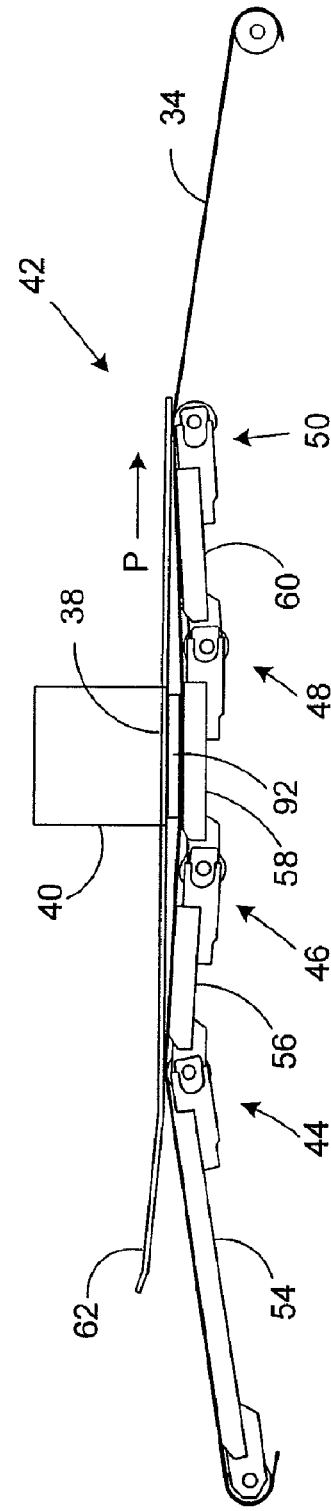

FIG. 6D shows the postcard 92 in position under the item processing element 40 with the item registration device 42 maintaining the postcard 92 in registration with the guide plate 38. The postcard 92 subsequently moves out of the item transport system 12 along the transport path P.

The item registration device 42 according to the invention may be configured to process items having a constant pitch, defined as the distance between the leading edges of consecutive items. In one embodiment, the pitch is approximately 25 inches.

It will be apparent to those skilled in the art that various modifications and variations can be made to the structure and methodology described herein. Thus, it should be understood that the invention is not limited to the examples discussed in the specification. Rather, the present invention is intended to cover modifications and variations.

What is claimed is:

1. An item transport system, comprising:
   a first transport element rotating around a plurality of first transport rollers in a first direction;
   a second transport element in opposing relation to the first transport element, the second transport element rotating around a plurality of second transport rollers in a second direction opposite to the first direction, wherein items received between the transport elements are conveyed along a transport path;

a guide plate proximate to the first transport element for engaging the items during processing by an item processing element; and an item registration device configured to maintain the items in registration with the guide plate, the item registration device comprising:

a plurality of independently articulating pivot assemblies biased to engage the second transport element with the first transport element; and a plate associated with each pivot assembly, wherein each plate is fixedly constrained with respect to the pivot assembly at one end and slidably constrained with respect to the pivot assembly at another end.

2. The system of claim 1, wherein the pivot assemblies are configured to provide positive control between the transport elements for consecutive items having a thickness differential.

3. The system of claim 2, wherein the thickness differential is up to approximately 1.75 inches.

4. The system of claim 1, wherein the plurality of independently articulating pivot assemblies comprises:
an upstream angle pivot assembly;
a downstream angle pivot assembly; and
at least one intermediate pivot assembly disposed between the upstream angle pivot assembly and the downstream angle pivot assembly.

5. The system of claim 4, wherein each pivot assembly comprises:
a first member pivotable about a pivot axis;
at least one of the second transport rollers disposed on the first member; and
a plate support element disposed on the first member.

6. The system of claim 5, wherein the pivot axis is substantially perpendicular to the transport path.

7. The system of claim 5, wherein the upstream angle pivot assembly and the downstream angle pivot assembly further comprise:
a second member arranged at an angle with respect to the first member and pivotable with the first member about the pivot axis; and
at least one of the second transport rollers disposed on the second member.

8. The system of claim 5, wherein the item registration device further comprises:
an upstream roller assembly supporting at least one of the second transport rollers and comprising a plate support element; and
a downstream roller assembly supporting at least one of the second transport rollers.

9. The system of claim 8, wherein each plate is fixedly constrained at an upstream end and slidably constrained at a downstream end.

10. The system of claim 9, wherein each plate is connected to respective plate support elements.

11. The system of claim 1, wherein each pivot assembly comprises a follower.

12. The system of claim 11, further comprising:
an elongated member;
a plurality of cams disposed on the elongated member, wherein each cam engages a respective follower; and
an actuator for translating the elongated member, wherein translation of the elongated member causes rotation of the cams and corresponding motion of the respective followers to move the pivot assemblies to a deactivated position in which the second transport element is spaced from the first transport element.

13. The system of claim 1, wherein the item processing element comprises an inkjet printer.

14. An item transport system, comprising:
a first transport element rotating around a plurality of first transport rollers in a first direction;
a second transport element in opposing relation to the first transport element, the second transport element rotating around a plurality of second transport rollers in a second direction opposite to the first direction, wherein items received between the transport elements are conveyed along a transport path;
a guide plate for maintaining the items at a fixed distance from an item processing element during processing by the item processing element; and
an item registration device configured to maintain the items in registration with the guide plate, the item registration device comprising:
an upstream roller assembly supporting at least one of the second transport rollers;
a downstream roller assembly supporting at least one of the second transport rollers;
a plurality of independently articulating pivot assemblies biased to engage the second transport element with the first transport element; and
a plate associated with each pivot assembly, wherein each plate is fixedly constrained with respect to the pivot assembly at one end and slidably constrained with respect to the pivot assembly at another end.

15. The system of claim 14, wherein the pivot assemblies are configured to provide positive control between the transport elements for consecutive items having a thickness differential of up to approximately 1.75 inches.

16. The system of claim 14, wherein the plurality of independently articulating pivot assemblies comprises:
an upstream angle pivot assembly;
a downstream angle pivot assembly; and
at least one intermediate pivot assembly disposed between the upstream angle pivot assembly and the downstream angle pivot assembly.

17. The system of claim 16, wherein each pivot assembly comprises:
a first member pivotable about a pivot axis;
at least one of the second transport rollers disposed on the first member; and
a plate support element disposed on the first member.

18. The system of claim 17, wherein the upstream angle pivot assembly and the downstream angle pivot assembly further comprise:
a second member arranged at an angle with respect to the first member and pivotable with the first member about the pivot axis; and
at least one of the second transport rollers disposed on the second member.

19. The system of claim 14, wherein each plate is fixedly constrained at an upstream end and slidably constrained at a downstream end.

20. The system of claim 14, wherein the item processing element comprises an inkjet printer.

21. A method of conveying items, comprising:
receiving the items in an item transport system, wherein the item transport system comprises:
a first transport element rotating around a plurality of first transport rollers in a first direction; and
a second transport element in opposing relation to the first transport element, the second transport element rotating around a plurality of second transport rollers in a second direction opposite to the first direction;

conveying the items between the transport elements along a transport path; and maintaining the items in registration with a guide plate during processing of the items by an item processing element using an item registration device, the item registration device comprising:

a plurality of independently articulating pivot assemblies biased to engage the second transport element with the first transport element; and a plate associated with each pivot assembly, wherein each plate is fixedly constrained with respect to the pivot assembly at one end and slidably constrained with respect to the pivot assembly at another end.

22. The method of claim 21, further comprising providing positive control between the transport elements for consecutive items having a thickness differential of up to approximately 1.75 inches.

23. The method of claim 21, wherein the item processing element comprises an inkjet printer.

* * * * *